US012807120B2

(12) United States Patent
Custer et al.

(10) Patent No.: US 12,807,120 B2
(45) Date of Patent: Nov. 24, 2026

(54) SYSTEM AND METHOD FOR CONTROLLING A VEHICLE BRAKE

(71) Applicant: Bendix Commercial Vehicle Systems LLC, Avon, OH (US)

(72) Inventors: Robert J. Custer, Westlake, OH (US); Ryan S. Hurley, Lakewood, OH (US)

(73) Assignee: BENDIX COMMERCIAL VEHICLE SYSTEMS LLC, Avon, OH (US)

( * ) Notice: Subject to any disclaimer, the term of this patent is extended or adjusted under 35 U.S.C. 154(b) by 470 days.

(21) Appl. No.: 18/624,652

(22) Filed: Apr. 2, 2024

(65) Prior Publication Data

US 2025/0304027 A1 Oct. 2, 2025

(51) Int. Cl.

*B60T 17/22* (2006.01)
*B60T 13/68* (2006.01)
*B60T 7/12* (2006.01)

(52) U.S. Cl.

CPC .......... *B60T 17/221* (2013.01); *B60T 13/683* (2013.01); *B60T 7/12* (2013.01); *B60T 2270/402* (2013.01); *B60T 2270/406* (2013.01)

(58) Field of Classification Search

CPC ........ B60T 17/221; B60T 13/683; B60T 7/12; B60T 2270/0402; B60T 2270/0406
See application file for complete search history.

(56) References Cited

U.S. PATENT DOCUMENTS

2019/0263371 A1* 8/2019 Goers .................... B60T 15/027
2022/0274573 A1* 9/2022 Otremba ............... B60T 13/683

FOREIGN PATENT DOCUMENTS

CN 205538256 U 8/2016
CN 113911094 B 8/2022
WO WO-2017221836 A1 * 12/2017 ................ B60T 8/40

OTHER PUBLICATIONS

English (machine) translation of CN 113911094 B.
English (machine) translation of CN 205538256 U.

* cited by examiner

*Primary Examiner* — Vishal R Sahni
(74) *Attorney, Agent, or Firm* — Reising Ethington P.C.

(57) ABSTRACT

A brake control system for a vehicle includes primary and secondary controllers that control components of a fluid circuit. The fluid circuit includes a parking brake valve module and two solenoid valves controlling fluid flow to the module from two fluid sources. A double check valve in the module passes the greater fluid pressure which is measured by a pressure sensor. The secondary controller performs, prior to any failure of the primary controller, a diagnostic test. The secondary controller receives signals indicative of fluid pressure in each fluid source and the module. When the fluid pressures of the fluid sources differ, the secondary controller blocks the valve coupled to the higher pressure fluid source, compares the measured fluid pressures in the module and one of the fluid sources and, depending on the results of the comparison, generates an alert regarding the valve coupled to the lower pressure fluid source.

20 Claims, 3 Drawing Sheets

SYSTEM AND METHOD FOR CONTROLLING A VEHICLE BRAKE

BACKGROUND OF THE INVENTION a. Field of the Invention

This disclosure relates to braking systems for vehicles. In particular, this disclosure relates to system that includes primary and secondary controllers for components of a fluid circuit used to generate and transmit fluid pressure to vehicle wheel brakes and that is configured to test a parking brake control function of the secondary controller prior to any failure of the primary controller.

b. Background Art

Conventional pneumatic braking systems in vehicles include a fluid circuit that generates and transmits fluid pressure for use in actuating wheel brakes on the vehicle. The fluid circuit includes components, such as a compressor, for generating fluid pressure and components, such as valves, for controlling transmission of fluid pressure. Although the fluid circuit components of older braking systems were generally controlled using pneumatic control signals, the use of electronic braking systems, in which many of the fluid circuit components are controlled using electronic control signals, is continuously increasing. Electronic braking systems offer several advantages relative to prior art pneumatic controlled braking systems. Electronic braking systems shorten the response time between a brake command and application of the brakes because electrical control signals travel faster than pneumatic control signals. Electronic braking systems also allow more accurate control of brake pressure due to the use of pressure sensors and other feedback systems. Electronic brake systems also allow brake pressure to be set independently of the position of operator controls such as brake pedals.

Because of the importance of the braking system to the safe operation of the vehicle, vehicles incorporating electronic braking systems may include both a primary controller for certain components of the fluid circuit and a secondary, or backup, controller for certain components of the fluid circuit to ensure that safety critical functions—such as application of the vehicle parking brake—can still be performed in the event of a failure of the primary controller. The secondary controller typically only performs certain functions when a failure occurs in the primary controller. Therefore, it is important to periodically test the operation of the secondary controller to verify that the secondary controller, and the fluid circuit components controlled by the secondary controller, will function properly when needed. Conventional testing methods, however, have several disadvantages.

One method for testing a conventional braking system is to actuate fluid valves within the system to exhaust fluid from a fluid path resulting in an audible noise of "chuff". This method, however, is not completely reliable because it is dependent on the ability of an individual's ability to hear the noise (despite potential differences in ability among individuals and differences in ambient noise when the method is performed) recognition of the significance the noise by the individual, and a willingness to act on the noise by the individual. Further, in autonomous vehicles that operate without a human operator, additional components would be required to capture and evaluate the noises produced using this method.

Another method for testing a conventional electronic braking system is to attempt to measure values indicative of the successful transmission and receipt of electrical control signals for electrically controlled valves in the fluid circuit. A secondary controller, however, typically has limited functionality and capabilities because of its intended use and therefore may lack the necessary components for these measurements. In addition, the relatively simple structure and operation of solenoid valves in the fluid circuit can make it difficult to obtain measurements providing useful information.

The inventors herein have recognized a need for a brake control system for a vehicle and related method that will minimize and/or eliminate one or more of the above-identified deficiencies.

BRIEF SUMMARY OF THE INVENTION

This disclosure relates to braking systems for vehicles. In particular, this disclosure relates to system that includes primary and secondary controllers for components of a fluid circuit used to generate and transmit fluid pressure to vehicle wheel brakes and that is configured to test a parking brake control function of the secondary controller prior to any failure of the primary controller.

An embodiment of a brake control system for a vehicle includes a fluid circuit configured to generate and distribute fluid pressure. The fluid circuit includes a parking brake valve module configured to control delivery of fluid pressure to, and venting of fluid pressure from, a brake actuator of a wheel brake to apply and release a parking brake. The parking brake valve module is configured to receive a first fluid pressure from a first fluid source and a second fluid pressure from a second fluid source and includes a double check valve configured to deliver a greater fluid pressure of the first fluid pressure and the second fluid pressure and a pressure sensor that generates a greater pressure signal indicative of the greater fluid pressure. The fluid circuit further includes a first solenoid valve having a supply port in communication with the first fluid source, a delivery port in fluid communication with the parking brake valve module, and an exhaust port. The first solenoid valve is biased to a first state in which the supply port and delivery port are in fluid communication. The fluid circuit further includes a second solenoid valve having a supply port in communication with the second fluid source, a delivery port in fluid communication with the parking brake valve module, and an exhaust port. The second solenoid valve is biased to a first state in which the supply port and delivery port are in fluid communication. The system further includes a primary controller configured to control a first set of components in the fluid circuit and a secondary controller configured to control a second set of components in the fluid circuit following a failure of the primary controller. The secondary controller is further configured, prior to the failure of the primary controller, to receive a first pressure signal indicative of the first fluid pressure, a second pressure signal indicative of the second fluid pressure and the greater pressure signal. The secondary controller is further configured to move, when the first fluid pressure is greater than the second fluid pressure, the first solenoid valve from the first state to a second state in which the delivery port and exhaust port are in fluid communication, compare the greater fluid pressure to one of the first fluid pressure and the second fluid pressure, and generate an alert when the greater fluid pressure does not meet a first predetermined condition relative to the one of the first fluid pressure and the second fluid pressure.

An embodiment of an article of manufacture includes a non-transitory computer storage medium having a computer program encoded thereon that when executed by a secondary controller of a brake control system for a vehicle, performs a diagnostic test of a parking brake control function of the secondary controller. The brake control system includes a fluid circuit configured to generate and distribute fluid pressure. The fluid circuit includes a parking brake valve module configured to control delivery of fluid pressure to, and venting of fluid pressure from, a brake actuator of a wheel brake to apply and release a parking brake. The parking brake valve module is configured to receive a first fluid pressure from a first fluid source and a second fluid pressure from a second fluid source and includes a double check valve configured to deliver a greater fluid pressure of the first fluid pressure and the second fluid pressure and a pressure sensor that generates a greater pressure signal indicative of the greater fluid pressure. The fluid circuit further includes a first solenoid valve having a supply port in communication with the first fluid source, a delivery port in fluid communication with the parking brake valve module, and an exhaust port. The first solenoid valve is biased to a first state in which the supply port and delivery port are in fluid communication. The fluid circuit further includes a second solenoid valve having a supply port in communication with the second fluid source, a delivery port in fluid communication with the parking brake valve module, and an exhaust port. The second solenoid valve is biased to a first state in which the supply port and delivery port are in fluid communication. The brake control system further includes a primary controller configured to control a first set of components in the fluid circuit and the secondary controller, the secondary controller configured to control a second set of components in the fluid circuit following a failure of the primary controller. The computer program includes code for receiving a first pressure signal indicative of the first fluid pressure, a second pressure signal indicative of the second fluid pressure and the greater pressure signal. The computer program further includes code for moving, when the first fluid pressure is greater than the second fluid pressure, the first solenoid valve from the first state to a second state in which the delivery port and exhaust port are in fluid communication, comparing the greater fluid pressure to one of the first fluid pressure and the second fluid pressure, and generating an alert when the greater fluid pressure does not meet a first predetermined condition relative to the one of the first fluid pressure and the second fluid pressure An embodiment of a method for testing a parking brake control function of a secondary controller in a brake control system is also provided. The brake control system includes a fluid circuit configured to generate and distribute fluid pressure. The fluid circuit includes a parking brake valve module configured to control delivery of fluid pressure to, and venting of fluid pressure from, a brake actuator of a wheel brake to apply and release a parking brake. The parking brake valve module is configured to receive a first fluid pressure from a first fluid source and a second fluid pressure from a second fluid source and includes a double check valve configured to deliver a greater fluid pressure of the first fluid pressure and the second fluid pressure and a pressure sensor that generates a greater pressure signal indicative of the greater fluid pressure. The fluid circuit further includes a first solenoid valve having a supply port in communication with the first fluid source, a delivery port in fluid communication with the parking brake valve module, and an exhaust port. The first solenoid valve is biased to a first state in which the supply port and delivery port are in fluid communication. The fluid circuit further includes a second solenoid valve having a supply port in communication with the second fluid source, a delivery port in fluid communication with the parking brake valve module, and an exhaust port. The second solenoid valve is biased to a first state in which the supply port and delivery port are in fluid communication. The brake control system further including a primary controller configured to control a first set of components in the fluid circuit and the secondary controller. The secondary controller is configured to control a second set of components in the fluid circuit following a failure of the primary controller. The method includes receiving a first pressure signal indicative of the first fluid pressure, a second pressure signal indicative of the second fluid pressure and the greater pressure signal. The method further includes moving, when the first fluid pressure is greater than the second fluid pressure, the first solenoid valve from the first state to a second state in which the delivery port and exhaust port are in fluid communication, comparing the greater fluid pressure to one of the first fluid pressure and the second fluid pressure, and generating an alert when the greater fluid pressure does not meet a first predetermined condition relative to the one of the first fluid pressure and the second fluid pressure.

A brake control system and method in accordance with the teachings disclosed herein is advantageous relative to conventional systems and methods. Because the system and method facilitate testing of the secondary controller and related components without relying on audible signals, the system and method are more reliable and can be used on autonomous vehicles without adding additional components. Because the system and method facilitate testing of the secondary controller and related components without relying on the measurement of electrical values associated with the transmission and reception of electrical control signals, the system and method can be implemented without substantial modifications to existing secondary controllers having limited capabilities and functionality and despite the use of relatively simple solenoid valves in the fluid circuit.

The foregoing and other aspects, features, details, utilities, and advantages of the present teachings will be apparent from reading the following description and claims, and from reviewing the accompanying drawings.

DETAILED DESCRIPTION OF THE INVENTION

Figure 1:
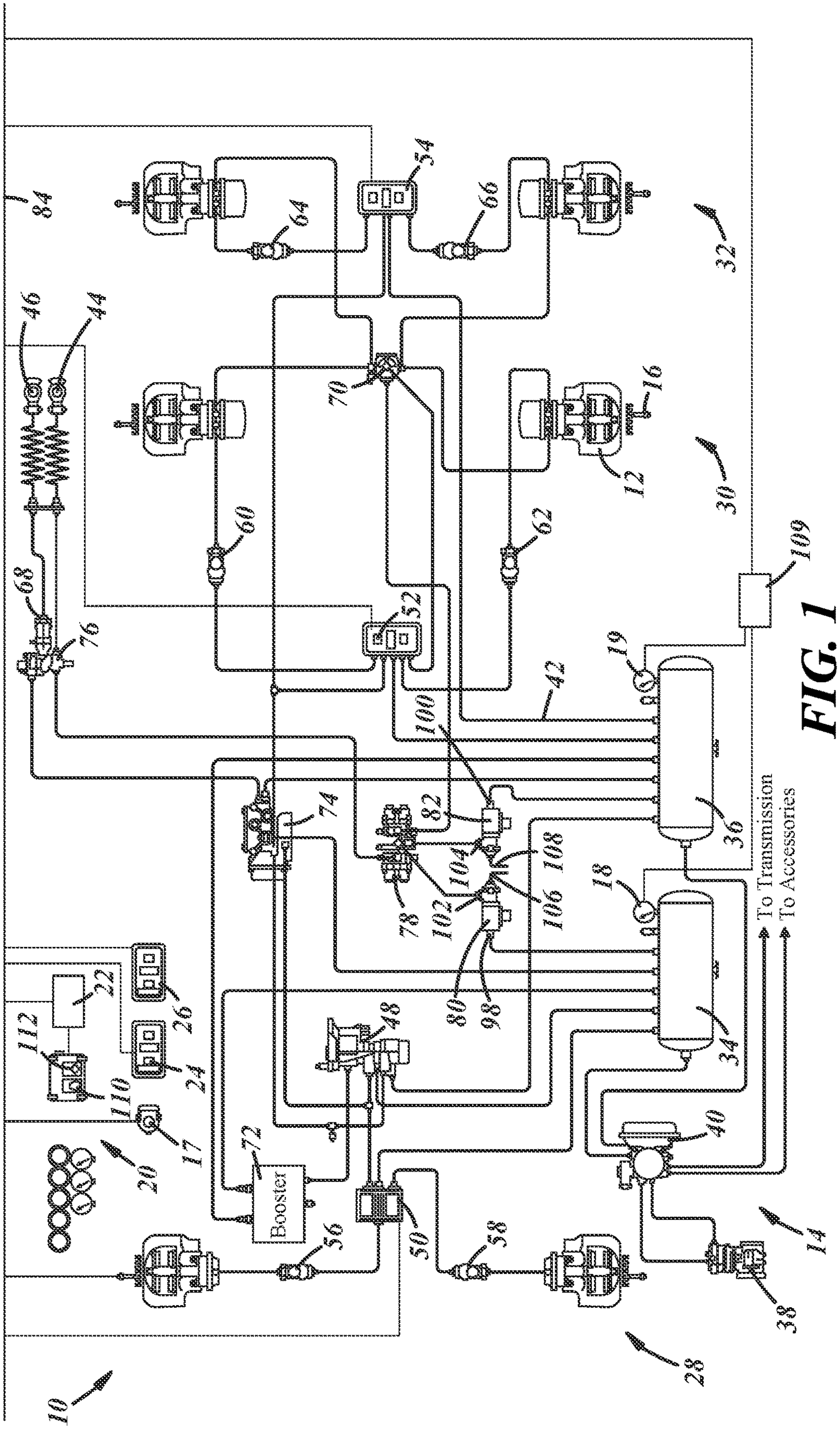
FIG. 1 is a diagrammatic view of a brake control system for a vehicle in accordance with the teachings set forth herein.

Referring now to the drawings wherein like reference numerals are used to identify identical components in the various views, FIG. 1 illustrates on embodiment of a brake control system 10 for a vehicle. In the illustrated embodiment, the vehicle comprises a heavy commercial vehicle and, in particular, a tractor or power unit configured for towing one or more trailers or towed units. It should be understood, however, that the systems and methods disclosed herein may find application on other types of commercial vehicles including, for example, tractors operating without trailers, buses, etc. and may also find application on non-commercial vehicles. System 10 is configured to brake one or more wheels in order to slow, stop or prevent movement of the vehicle. System 10 may be configured to brake the vehicle in response to commands from an operator of the vehicle, but may also be configured to implement autonomous braking (i.e., without commands from the operator of the vehicle) as part of an advanced driver assistance system (ADAS) or automated driving system (ADS) in order to provide various functions such as automated emergency braking (AEB), anti-lock braking (ABS), collision avoidance, adaptive cruise control, traction control or stability control. In accordance with one aspect of the systems and methods disclosed herein, the systems and methods disclosed herein may be adapted for use on fully autonomous vehicles in which all aspects of vehicle operation are performed without any input from a human operator. System 10 may include one or more wheel brakes 12, a fluid circuit 14 that generates and transmits fluid pressure to wheel brakes 12, sensors that identify various conditions associated with the vehicle and the surrounding environment and that impact braking of the vehicle including sensors 16, 17, 18, 19 an operator interface 20 and several controllers including a dash interface controller 22, a primary controller 24, and a redundant or secondary controller 26.

Wheel brakes 12 are configured to apply a braking force to one or more wheels on the vehicle. In the illustrated embodiment, wheel brakes 12 are located at each end of a steer axle 28, a drive axle 30 and an auxiliary axle 32 (which may, for example, also comprise a drive axle in certain embodiments). Brakes 12 may comprise disc brakes in which a carrier supports brake pads on opposite sides of a rotor rotating with the wheel and an actuator causes, responsive to fluid pressure delivered by fluid circuit 14 or another force, movement of a caliper relative to the carrier to move the brake pads into and out of engagement with the rotor. Alternatively, wheel brakes 12 may comprise drum brakes in which an actuator causes, responsive to fluid pressure delivered by fluid circuit 14 or another force, movement of one or more brake shoes into and out of engagement with a braking surface in a brake drum rotating with the wheel. Wheel brakes 12 may be configured to function as both a service brake for applying service braking while the vehicle is an active state and as a parking brake for applying parking or emergency braking while the vehicle is an active or inactive state. To enable functionality as a parking brake, the brake actuator for wheel brake 12 may include a spring that biases the wheel brake 12 to an engaged or applied state. Fluid pressure provided to the brake actuator is used to overcome the force of the spring and move the wheel brake 12 to a disengaged or released state.

Fluid circuit 14 generates fluid pressure within system 10 and controls the delivery of fluid pressure to the actuator of each wheel brake 12 to engage/apply or disengage/release either or both of a service brake and a parking brake depending on the configuration of the wheel brake 12. Circuit 14 may include components for generating and storing pressurized fluid including fluid sources or reservoirs 34, 36, a compressor 38, and an air treatment module 40 and components for routing and delivering fluid pressure to wheel brakes 12 including fluid conduits 42, glad-hand connectors 44, 46 between the tractor and any trailers, and various devices for controlling the flow of fluid within circuit 14 including foot brake module 48, electropneumatic modules 50, 52, 54, modulators 56, 58, 60, 62, 64, 66, 68 quick release valve 70, booster module 72, trailer control module 74, tractor protection valve 76, parking brake control module 78 and solenoid valves 80, 82. Although it is not illustrated, each of the foot brake module 48, the modulators 56, 58, 60, 62, 64, 66, 68, the booster module 72, the trailer control module 74, and the parking brake control module 78 communicates with (e.g., via respective direct electrical connections) at least one of the primary controller 24 and the redundant or secondary controller 26.

Fluid sources 34, 36 store compressed fluid for use in applying wheel brakes 12. Fluid source 34 has a fluid port coupled to air treatment module 40 and fluid ports coupled to foot brake module 48, electropneumatic module 50, booster module 72, trailer control module 74 and solenoid valve 80. Fluid source 36 has a fluid port coupled to air treatment module 40 and fluid ports coupled to foot brake module 48, electropneumatic modules 54, 56, booster module 72, trailer control module 74, and solenoid valve 82. Pressure sensors 18, 19 in each fluid source 34, 36 or in conduits 42 directly coupled to fluid ports on each fluid source 34, 36 may generate pressure signals indicative of fluid pressure in each fluid source 34, 36. These signals may be provided to other components of system 10, including primary controller 24 and secondary controller 26, over a conventional vehicle communications bus 84 implementing a communications network such as a controller area network (CAN) or local interconnect network (LIN) or over a vehicle power line through power line communication (PLC) in accordance with various industry standard protocols including by not limited to SAE J1939, SAEJ1922, and SAE J2497 or using a proprietary protocol.

Compressor 38 draws in air and compresses the air for delivery to fluid sources 34, 36 through air treatment module 40. Compressor 38 has one or more fluid ports coupled to air treatment nodule 40.

Air treatment module 40 is provided to collect and remove solid, liquid and vapor contaminants from pressurized fluid provided by compressor 38. Air treatment module 40 is disposed between compressor 38 and fluid sources 34, 36 and has fluid ports coupled to compressor 38 and each fluid sources 34, 36.

Fluid conduits 42 are used to transport fluid between fluid sources 34, 36, compressor 38, air treatment module 40, glad-hand connectors 44, 46, foot brake module 48, electropneumatic modules 50, 52, 54, modulators 56, 58, 60, 62, 64, 66, 68, quick release valve 70, booster module 72, trailer control module 74, tractor protection valve 76, parking brake control module 78 and solenoid valves 80, 82. Conduits 42 may be made from conventional metals and/or plastics and have connectors at either end configured to join the conduits 42 to corresponding components of circuit 14.

Glad hand connectors 44, 46 are provided to transmit pressurized fluid from the tractor to any trailers coupled to the tractor. One of connectors 44 is used to transmit supply/emergency fluid pressure while the other connector 46 is used to transmit service/control fluid pressure.

Foot brake module 48 provides an interface through which a vehicle operator may input a command to apply wheel brakes 12 and control the delivery of fluid pressure to wheel brakes 12 for service braking. Module 48 includes a brake pedal that may be actuated by the operator. Actuation of the brake pedal opens a valving member in foot brake module 48 that allows fluid pressure from fluid sources 34, 36 to flow to electro-pneumatic modules 50, 52, 54. If the vehicle is operated autonomously (without operator inputs), foot brake module 48 acts as a relay valve forwarding fluid pressure from fluid sources 34, 36 or booster module 72 to electropneumatic modules 50, 52, 54.

Electropneumatic modules 50, 52, 54 are provided to control delivery of fluid pressure to wheel brakes 12 on steer axle 28, drive axle 30 and auxiliary axle 32, respectively. Module 50 may define a single fluid channel configured to deliver the same fluid pressure to wheel brakes 12 on either end of steer axle 28. Modules 52, 54, may define a pair of fluid channels permitting delivery of varying fluid pressure to the wheel brakes on either end of drive axle 30 and auxiliary axle 32 for use in stability control. Modules 50, 52, 54 includes one or more relay valves that deliver fluid pressure from a corresponding fluid source 34, 36 to wheel brakes 12 or exhausts fluid pressure from wheel brakes 12 responsive to a control pressure from foot brake module 48. The relay valves increase the volume of fluid, and therefore the flow, at which fluid is delivered to, and exhausted from, wheel brakes 12 in order to reduce lag times between the commanded and actual application and release of wheel brakes 12. Modules 50, 52, 54 further includes solenoid valves configured to regulate the control pressure from foot brake module 48 and, therefore, control the operation of the relay valve. An electronic control unit in each module 50, 52, 54 controls the operation of the solenoid valves responsive to control signals from controller 24 or 26. The electronic control unit may also process signals from pressure sensors within modules 50, 52, 54 and from wheel speed sensors and brake lining wear sensors associated with corresponding wheels and wheel brakes 12, respectively, and may generate and transmit signals indicative of fluid pressure, wheel speed and brake lining wear to controller 24 or 26. Modules 50, 52, 54 may exchange signals with controllers 24 and 26 and other vehicle systems over bus 84.

Modulators 56, 58, 60, 62, 64, 66, 68 are provided to implement anti-lock braking and electronic stability control functions. During normal braking, modulators 56, 58, 60, 62, 64, 66, 68 allow fluid pressure to pass from electropneumatic modules 50, 52, 54 to wheel brakes 12 and from tractor protection valve 76 to any trailers without interference. During a loss of traction, however, signals from controllers 24, 26 cause modulators 56, 58, 60, 62, 64, 66, 68 to modulate the fluid pressure to prevent lockup of the vehicle wheels. Modulators 56, 58, 60, 62, 64, 66 have supply ports coupled to delivery ports in electropneumatic modules 50, 52, 54 and delivery ports coupled to wheel brakes 12. Modulator 68 has a supply port coupled to tractor protection valve 76 and a delivery port coupled to glad hand connector 46.

Quick release valve 70 transmits fluid pressure from parking brake valve module 78 to the brake actuators for the wheel brakes 12 on drive axle 30 and auxiliary axle 32 and exhausts fluid from wheel brakes 12 in the absence of fluid pressure from parking brake valve module 78. Valve 70 has a supply port in fluid communication with a delivery port on parking brake valve module 78 and delivery ports in fluid communication with the brake actuators for the wheel brakes 12 on drive axle 30 and auxiliary axle 32. Valve 70 further has a balance port in fluid communication with electropneumatic module 52 to prevent compounding during service braking.

Trailer control module 74 enables control of the wheel brakes on any trailers independent of the wheel brakes 22 on the tractor. Trailer control module 74 includes supply ports in fluid communication with fluid sources 34, 36, a delivery port in fluid communication with tractor protection valve 76 and control ports in fluid communication with foot brake module 48.

Tractor protection valve 76 transmits pneumatic signals relating to operation of the trailer wheel brakes from the tractor to any trailers to enable control of wheel brakes on trailers by system 10. Valve 76 also protects the fluid supply for the tractor in the event of a failure in the fluid connection between the tractor and trailers. Valve 76 includes a supply port and a control port in fluid communication with parking brake valve module 78 and trailer control module 74, respectively, and delivery ports in fluid communication with gladhand connector 44 and modulator 68.

Figure 2:
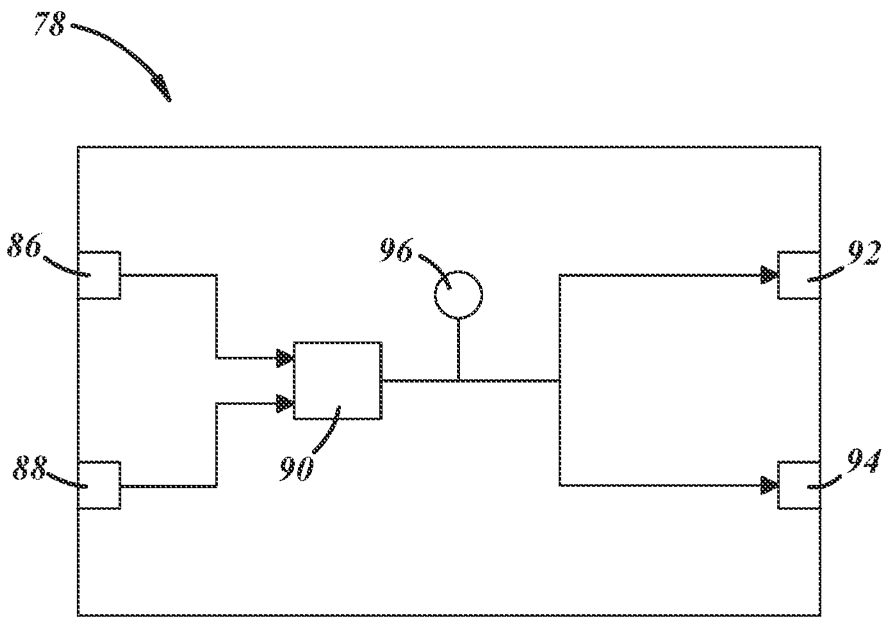
FIG. 2 is a diagrammatic view of a parking brake valve module of the brake control system of FIG. 1.

Parking brake valve module 78 controls delivery of fluid pressure to the brake actuators of wheel brakes 12 on drive axle 30, auxiliary axle 32 and any trailers for use in controlling the application and release of parking brakes in the wheel brakes 12. Module 78 may define a pair of fluid channels. Referring to FIG. 2, module 78 includes supply ports 86, 88 that are coupled to delivery ports on solenoid valves 80, 82. A double check valve 90 outputs the greater of the fluid pressures at supply ports 86, 88 to each fluid channel. Module 78 further includes delivery ports 92, 94 coupled to supply ports on quick release valve 70 and tractor protection valve 76 and exhaust ports (not shown). Solenoid piloted valves (not shown) in module 78 control fluid flow in each channel and are spring-biased to a first position connecting the delivery ports 92, 94 to the exhaust ports to vent the conduits between parking brake valve module 78 and quick release valve 70 and between parking brake valve module 78 and tractor protection valve 76 to atmosphere and thereby maintain the parking brakes in an applied state. An electronic control unit (not shown) in module 78 energizes the solenoid piloted valves responsive to control signals from one of controllers 22, 24, 26 to move the valves to a second position connecting the output of the double check valve 90 and the delivery ports 92, 94 to provide fluid pressure to quick release valve 70 and tractor protection valve 76 and, ultimately, move the parking brakes to a released state. Module 78 may further include one or more pressure sensors configured to generate signals indicative of fluid pressure at various locations within module 78 including a pressure sensor 96 that generates a pressure signal indicative of the fluid pressure output by double check valve 90. The pressure signal generated by pressure sensor 96 may be transmitted to any of controllers 22, 24, 26 indirectly by the electronic control unit in module 78 over bus 84 (as illustrated in FIG. 1) or, alternatively, by respective direct connections between the pressure sensor 96 (module 78) and the controllers 22, 24, 26.

Referring again to FIG. 1, solenoid valves 80, 82 control delivery of fluid pressure to, and venting of fluid pressure from, conduits 42 between solenoid valves 80, 82 and parking brake control module 78. Solenoid valves 80, 82 may comprise conventional three way, two position valves each having a supply port 98, 100, respectively, in communication with a corresponding fluid source 34, 36, a delivery port 102, 104, respectively, in fluid communication with a corresponding supply port 86, 86 in parking brake control module 78, and an exhaust port 106, 108, respectively. Valves 80, 82 are biased to a first state in which a fluid path is established between the supply and delivery ports 98, 102 and 100, 104, respectively, of each valve 80, 82 to deliver fluid pressure from fluid sources 34, 36 to parking brake valve module 78 thereby enabling the parking brakes in wheel brakes 12 to remain in a released state. When energized, valves 80, 82 move from the first state to a second state in which a fluid path is established between the delivery and exhaust ports 102, 106 and 104, 108, respectively, of each valve 80, 82 to vent fluid pressure from the conduits 42 between valves 80, 82 and parking brake control module 78.

Sensors 16, 17, 18, 19 are provided to identify various conditions associated with the vehicle and the surrounding environment including conditions that may impact the operation of system 10. In the illustrated embodiment, sensor 16 comprises a wheel speed sensor configured to output a signal indicative of the rotational speed of a wheel for use in anti-lock braking and traction control. Sensor 17 comprises a steer angle sensor configured to output a signal indicative of the rotational position of a steering shaft for stability control. Sensors 18, 19 comprise pressure sensors configured to output pressure signals indicative of the fluid pressures in fluid sources 34, 36, respectively. It should be understood that system 10 may include a variety of other sensors that may impact control of system 10 including for example, yaw angle sensors and load sensors. Sensors 16, 17, 18, 19 may communicate with one or more of controllers 22, 24, 26 and/or other vehicle systems over communication bus 84. In the illustrated embodiment, sensors 18, 19 output pressure signals to a separate vehicle controller 109 which may, in turn, transmit pressure signals to controllers 24, 26.

Operator interface 20 provides an interface between the vehicle operator and system 10 through which the operator can control certain vehicle braking functions and receive information about vehicle braking. In the illustrated embodiment, for example, interface 20 allows the operator to control the fluid supply in any trailers coupled to the tractor and allows the operator to control the parking brake function of certain wheel brakes 12. Interface 20 may be mounted within the cabin of the tractor of the vehicle and, in particular, on the dashboard of the vehicle. Interface 20 may include one or more handles 110, 112 movable between a “pull” position, a “push” position and a neutral position between the “push” and “pull” positions. In the illustrated embodiment, handle 110 may be pulled to exhaust the trailer fluid supply and pushed to supply the trailer fluid supply while handle 112 may be pulled to apply a parking brake (e.g., by exhausting fluid from a brake actuator for a wheel brake 12 to allow a spring to apply the parking brake) and release the parking brake (e.g., by delivering fluid to the brake actuator for the wheel brake 12 opposing the spring to release the parking brake). When the operator actuates interface 20 and moves either of handles 110, 112 to either a “pull” or “push” position, interface 20 generates and transmits a command signal to controller 22 which generates corresponding control signals to implement the command. When the operator does not actuate interface 20 and handles 110, 112 remains in the neutral position, interface 20 does not generate or transmit a command signal to controller 22. Interface 20 may include further include light emitters, such as light emitting diodes, sound emitters, such as a speaker, and/or haptic actuators to convey visual, audio and/or haptic messages to the vehicle operator. In the case of visual alerts, different information can be conveyed through differences in color, differences in intensity, differences in the number of lights, and differences in the pattern of activation of the lights. In the case of audio alerts, different information can be conveyed through differences in the type of sound generated, differences in volume and differences in the pattern of sounds. In the case of haptic alerts, different information can be conveyed through differences in the length, intensity or pattern of vibration. Although a particular form of operator interface 20 is disclosed herein, it should be understood that the form of operator interface 20 may vary. Interface 20 could for example comprise one or more push buttons or switches, each of which may assume an applied (or depressed) position and a released position. Alternatively, operator interface 20 may comprise a touch screen display with a graphical user interface (GUI).

Each of dash interface controller 22, primary controller 24, and secondary controller 26 controls the operation of certain components of fluid circuit 14 in order to control the fluid pressure delivered to wheel brakes 12 and, therefore, the braking force applied to the wheels on the vehicle. In this manner, some or all of controllers 22, 24, 26 may be configured to implement parking/emergency braking and service braking as well as anti-lock braking (ABS), traction control and stability control when required. Controllers 22, 24, 26 may comprise programmable microprocessors or microcontrollers or may comprise application specific integrated circuits (ASIC). Each controller 22, 24, 26 may include a memory and a central processing unit (CPU). Each controller 22, 24, 26 may also include an input/output (I/O) interface including a plurality of input/output pins or terminals through which the controller 22, 24, 26 may receive a plurality of input signals and transmit a plurality of output signals. Controllers 22, 24, 26 may be configured to communicate with one or more components of braking system 10 such as fluid circuit 14, sensors 16, 17, 18, 19, and operator interface 20 directly using dedicated (hard) wire connections. Alternatively, or in addition, controllers 22, 24, 26 may be configured to communicate with one or more components of braking system 10 such as fluid circuit 14, sensors 16, 17, 18, 19 and operator interface 20 using bus 84 and to communicate with other vehicle systems over the same or a similar bus including, for example, controller 109 and advanced driver assistance systems (ADAS) or automated driving systems (ADS) to provide assisted or autonomous control of the vehicle.

Dash interface controller 22 is configured, in part, to generate and transmit brake control signals to parking brake control module 78 to apply or release the parking brakes in wheel brakes 12 on drive axle 30, auxiliary axle 32 and on any trailers responsive to operator commands through operator interface 20. Controller 22 may also generate and transmit brake control signals to module 78 to apply or release the parking brakes responsive to signals from various sensor or systems on the vehicle that request or indicate the parking brake should be applied or released. Controller may receive input signals including command signals from operator interface 20 and signals from other sensors and systems on the vehicle and may transmit output signals to components of fluid circuit 14 such as module 78 and to operator interface 20 to control outputs on interface 20 on bus 84.

Primary controller 24 is configured to control application and release of both the service brakes and parking brakes in wheel brakes 12 on axles 28, 30, 32 and in any trailers in response to commands from an operator or the vehicle or from advanced driver assistance systems (ADAS) or automated driving systems (ADS) on the vehicle. Primary controller 24 may receive input signals from a variety of sensors, including sensors 16, 17, 18, 19 and systems on the vehicle including, for example, automated emergency braking (AEB), anti-lock braking (ABS), collision avoidance, adaptive cruise control, traction control or stability control systems. Primary controller 24 may transmit output signals to foot brake module 48, electropneumatic modules 50, 52, 54, modulators 56, 58, 60, 62, 64, 66, 68 and trailer control module 74 to control fluid flow through foot brake module 48, electropneumatic modules 50, 52, 54, modulators 56, 58, 60, 62, 64, 66, 68 and trailer control module 74 and control transmission and delivery of fluid pressure within fluid circuit 14.

Secondary controller 26 is configured to perform a limited set of functions, relative to primary controller 24, in the event of a failure of primary controller 24. One of these functions is to control application and release of the parking brakes in wheel brakes 12 on steer axle 30, auxiliary axle 32 and any trailers in response to commands from an operator or from advanced driver assistance systems (ADAS) or automated driving systems (ADS) on the vehicle. Because primary controller 24 generates a status or "heartbeat" signal that is available to secondary controller 26 on bus 84, secondary controller 26 will detect a failure of primary controller 24 if the signal is absent. In addition to the status signal from primary controller 24, secondary controller 26 may receive input signals from a variety of sensors through bus 84, including sensors 16, 17, 18, 19 and systems on the vehicle including, for example, automated emergency braking (AEB), anti-lock braking (ABS), collision avoidance, adaptive cruise control, traction control or stability control systems. Secondary controller 26 may transmit output signals directly, or through bus 84, to booster module 72, modulators 58, 60, 62, 64, 66, and solenoid valves 80, 82 to control transmission and delivery of fluid pressure within fluid circuit 14.

Because certain functions in secondary controller 26 are only used in the event of a failure of primary controller 24 and because solenoid valves 80, 82 are only energized in the event of a failure of primary controller 24, it is desirable to periodically test secondary controller 78 and solenoid valves 80, 82 to verify that these components will function as intended in the event they are needed. Conventional testing methods, however, have several disadvantages as described hereinabove. The disclosed systems and methods enable testing of secondary controller 26 and solenoid valves 80, 82 while overcoming the disadvantages associated with prior art testing methods. In addition to verifying the operation of the secondary controller 26 and solenoid valves 80, 82, the disclosed systems and methods also result in periodic and more frequent actuation of these components thereby inhibiting the possibility that the components may seize or become locked in position due to material breakdown or accumulation of foreign materials that may occur during less frequent use.

Figure 3:
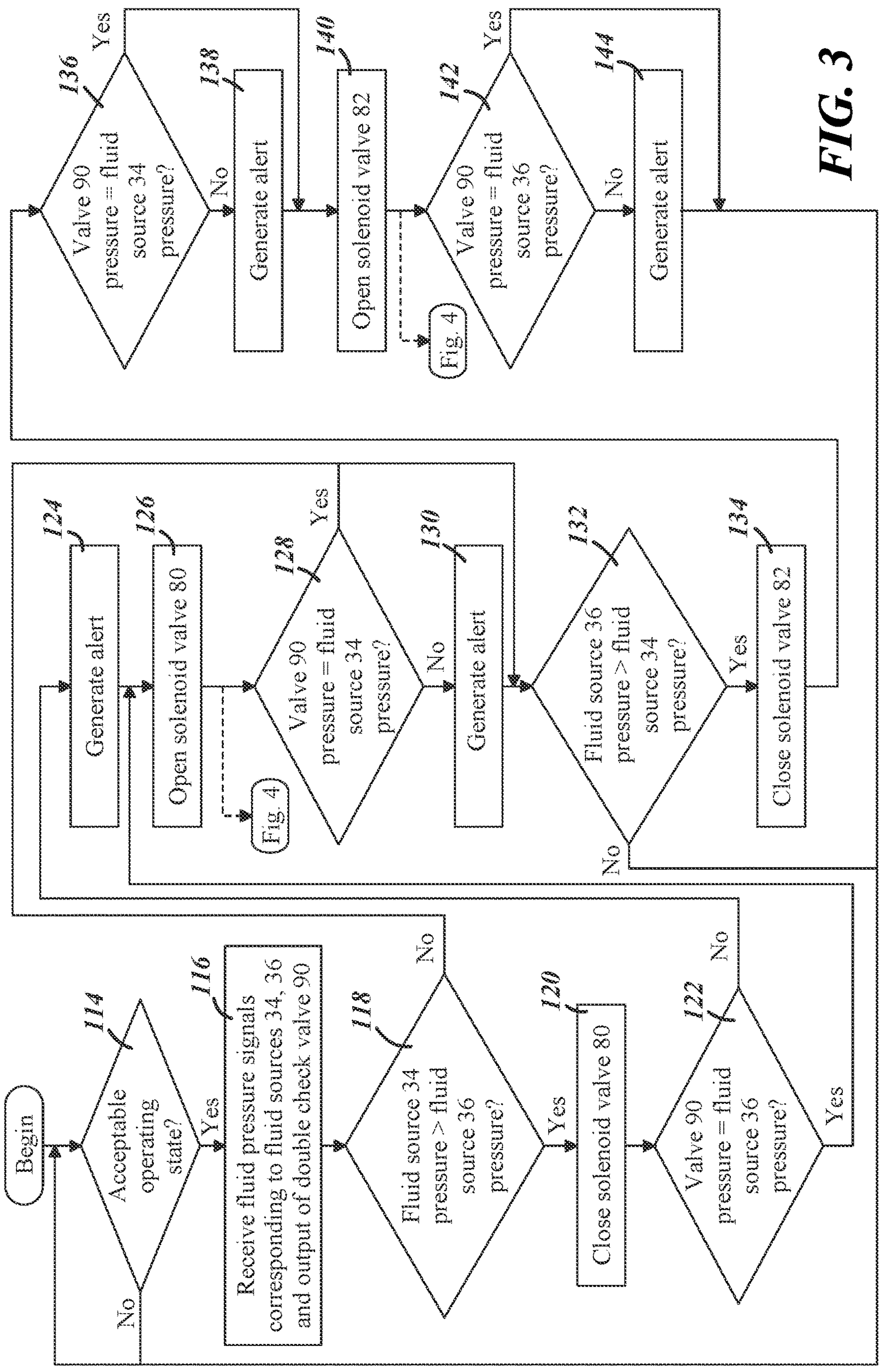
FIG. 3 is a flow chart diagram illustrating several steps in one embodiment of a method in accordance with the teachings set forth herein.

Referring now to FIG. 3, secondary controller 26 may be configured with appropriate programming instructions (i.e., software or a computer program) to implement various steps in a method for performing a diagnostic test of a parking brake control function of the secondary controller 26. This test will allow identification of failures in, for example, a solenoid in either solenoid valve 80, 82, a failure in the wiring between secondary controller 26 and solenoid valves 80, 82, or a failure of a component (e.g., a switch) in secondary controller 26 for transmitting control signals from secondary controller 26 to solenoid valves 80, 82. The instructions or computer program may be encoded on a non-transitory computer storage medium such as a memory within, or accessible by, secondary controller 26.

The method may begin with the step 114 of determining whether the vehicle and, in particular, system 10 is an appropriate or safe operating state for carrying out the diagnostic test. In accordance with one aspect of the systems and methods disclosed herein, the diagnostic test is preferably performed only when the vehicle is in certain operating states. Therefore, secondary controller 26 may be configured to determine the operating state of the vehicle and to only perform subsequent steps in the method if the operating state meets a predetermined condition. The operating states in which secondary controller 26 will perform subsequent steps in the method are generally those in which the vehicle is inactive or stationary so that testing does not interfere with normal operation of the vehicle. In one embodiment, secondary controller 26 is configured to determine whether the parking brake is applied or released and to perform subsequent steps in the method only when the parking brake is applied. Secondary controller 26 can determine whether or not the parking brake is applied responsive to status signals communicated on bus 84. In another embodiment, secondary controller 26 is configured to determine whether one or more of fluid sources 34, 36 are being charged and/or the current fluid pressure in a fluid source 34, 36 and to perform subsequent steps in the method only when a fluid source 34, 36 is being charged and/or when the fluid pressure in the fluid source 34, 36 meets a predetermined condition relative to a fluid pressure threshold (e.g., is less than the fluid pressure threshold) required for proper operation of the vehicle (i.e., movement of the vehicle from an inactive to an active state). Secondary controller 26 can determine whether or not the fluid sources 34, 36 are being charged responsive to status signals communicated on bus 84. Secondary controller 26 can determine the fluid pressure in fluid sources 34, 36 responsive to signals generated by pressure sensors 18, 19 associated with fluid sources 34, 36 and communicated on bus 84 (directly or indirectly through controller 109) and make the comparison to the fluid pressure threshold. It should be understood, however, that this comparison could be made in another controller or system on the vehicle and communicated to secondary controller 26 on bus 84. It should also be understood that the embodiments described above are exemplary only and that secondary controller 26 may be configured to determine a variety of different operating states for the vehicle that would indicate that the vehicle is stationary or inactive and/or that it is otherwise safe to perform the diagnostic test and that may be used to determine whether subsequent steps in the method should proceed.

If secondary controller 26 determines that the vehicle is not in an acceptable operating state for performing the diagnostic test, secondary controller 26 will refrain from performing further steps in the method until secondary controller 26 determines that the vehicle has reached an acceptable operating state. Once controller 26 determines that the vehicle is in an acceptable operating state, the method may continue with the step 116 of receiving pressure signals indicative of the fluid pressure in fluid source 34, the fluid pressure in fluid source 36 and the fluid pressure output by double check valve 90 in parking brake valve module 78.

Controller 26 may be further configured in step 118 to determine whether the fluid pressure in fluid source 34 is greater than the fluid pressure in fluid source 36. If the fluid pressure in fluid source 34 is greater than the fluid pressure in fluid source 36, the method may continue with the step 120 of moving solenoid valve 80 from its normally open state in which supply port 98 and delivery port 102 are in fluid communication to a closed state in which delivery port 102 and exhaust port 106 are in fluid communication. Controller 26 may transmit a signal to solenoid valve 80 to energize solenoid valve 80 and move valve 80 from the open state to the closed state. Doing so will block fluid flow from supply port 98 to delivery port 102 on solenoid valve 80 and vent the conduit 42 between parking brake valve module 78 and solenoid valve 80. Referring to FIG. 2, due to the absence of fluid pressure in this conduit and at port 86, double check valve 90 in parking brake valve module 78 will output the fluid pressure received at port 88 from fluid source 36 and solenoid valve 82 and pressure sensor 96 will generate a pressure signal indicative of this fluid pressure.

Referring again to FIG. 3, the method may continue with the steps 122, 124 of comparing the fluid pressure measured by pressure sensor 96 with the measured fluid pressure in one of fluid source 34 and fluid source 36 and generating an alert when the fluid pressure measured by pressure sensor 96 does not meet a predetermined condition relative to the measured fluid pressure in the one of fluid source 34 or fluid source 36. If system 12 is operating properly, the fluid pressure measured by pressure sensor 96 should be equal or at least substantially equal to the fluid pressure in fluid source 36, but less than the fluid pressure in fluid source 34 following the closure of solenoid valve 80. If the fluid pressure measured by pressure sensor 96 does not approximate the measured fluid pressure in fluid source 36 or is not lower than the fluid pressure in fluid source 34, a defect may exist in any of solenoid valves 80, 82, the conduits 42 between the fluid sources 34, 36 and solenoid valves 80, 82 and between solenoid valves 80, 82 and parking brake valve module 78, secondary controller 26 or the wiring between secondary controller 26 and solenoid valves 80, 82. Therefore, in one embodiment illustrated in FIG. 3, secondary controller 26 may compare the fluid pressure measured by pressure sensor 96 to the fluid pressure in fluid source 36 and the predetermined condition may be that the fluid pressure measured by pressure sensor 96 is equal to the measured fluid pressure in fluid source 36. Alternatively, the predetermined condition may be that the fluid pressure measured by pressure sensor 96 does not differ from the measured fluid pressure in fluid source 36 by more than a predetermined amount (i.e., the difference is less than a predetermined offset from the measured fluid pressure in fluid source 36 or is within a predetermined range containing the measured fluid pressure in fluid source 36). In yet another embodiment, secondary controller 26 may compare the fluid pressure measured by pressure sensor 96 to the fluid pressure in fluid source 34 and the predetermined condition may be that the fluid pressure measured by pressure sensor 96 is not greater than or equal to the fluid pressure in fluid source 34. If controller 26 determines that the fluid pressure measured by pressure sensor 96 does not meet the predetermined condition relative to the measured fluid pressure in fluid source 34 or fluid source 36, controller 26 will generate an alert. Secondary controller 26 may, for example, generate a control signal to operator interface 20 or another interface that provides audible, visual and/or haptic feedback to an operator of the vehicle. Secondary controller 26 may generate a control signal to a lighting system on the vehicle to cause activation of one or more lights (e.g., hazard lights) to warn other vehicles or pedestrians near the vehicle. Secondary controller 26 may generate an informational signal or control signal to one or more control systems on the vehicle capable of providing operator assistance or automated control of the vehicle. Secondary controller 26 may generate an informational signal to a vehicle telecommunication system that can be wirelessly transmitted to a remote monitoring system of a fleet manager. Secondary controller 26 may also generate an informational signal with data regarding the incident for storage in a memory of the controller 26 or another memory in the vehicle for later retrieval for monitoring or maintenance of the vehicle.

After step 124, of if the comparison in step 122 indicates that the fluid pressure measured by pressure sensor 96 meets the predetermined condition relative to the measured fluid pressure in fluid source 36, the method may continue with the step 126 of returning the solenoid valve 80 to its normally open state from the closed state. Controller 26 may transmit a signal to solenoid valve 80 to deenergize solenoid valve 80 and move valve 80 from the closed state to the open state. Steps 120 through 126 are performed in relatively quick succession to prevent and/or minimize possible release of the parking brakes in wheel brakes 12. Returning valve 80 to its normally open state will again place supply port 98 and delivery port 102 of solenoid valve 80 in fluid communication. Referring to FIG. 2, because the fluid pressure in fluid source 34 is greater than the fluid pressure in fluid source 36, double check valve 90 in parking brake valve module 78 will output the fluid pressure received at port 86 from fluid source 34 and solenoid valve 80 and pressure sensor 96 will generate a pressure signal indicative of this fluid pressure.

Referring again to FIG. 3, the method may continue with the steps 128, 130 of comparing the fluid pressure measured by pressure sensor 96 with the measured fluid pressure in the other of fluid source 34 and fluid source 36 (i.e., if the fluid pressure measured by pressure sensor 96 is compared to the fluid pressure in fluid source 36 in step 118, the fluid pressure measured by pressure 96 will be compared to the fluid pressure in fluid source 34 in step 128) and generating an alert when the fluid pressure measured by pressure sensor 96 does not meet a predetermined condition relative to the measured fluid pressure in the other of fluid source 34 and fluid source 36. If system 12 is operating properly, the fluid pressure measured by pressure sensor 96 should increase from the pressure measured prior to step 126 and the opening of solenoid valve 80 and should now be equal or at least substantially equal to the fluid pressure in fluid source 34 and should also be greater than the fluid pressure in fluid source 36. If the fluid pressure measured by pressure sensor 96 does not approximate the measured fluid pressure in fluid source 34 or is less than the fluid pressure in fluid source 36, a defect may again exist in any of solenoid valves 80, 82, the conduits 42 between the fluid sources 34, 36 and solenoid valves 80, 82 and between solenoid valves 80, 82 and parking brake valve module 78, secondary controller 26 or the wiring between secondary controller 26 and solenoid valves 80, 82. Therefore, in one embodiment illustrated in FIG. 3, secondary controller 26 may compare the fluid pressure measured by pressure sensor 96 to the fluid pressure in fluid source 34 and the predetermined condition may be that the fluid pressure measured by pressure sensor 96 is equal to the measured fluid pressure in fluid source 34. Alternatively, the predetermined condition may be that the fluid pressure measured by pressure sensor 96 does not differ from the measured fluid pressure in fluid source 34 by more than a predetermined amount (i.e., the difference is less than a predetermined offset from the measured fluid pressure in fluid source 34 or is within a predetermined range containing the measured fluid pressure in fluid source 34). In yet another embodiment in which secondary controller 26 compares the fluid pressure measured by pressure sensor 96 to the fluid pressure in fluid source 34 in step 122, secondary controller 26 may now compare the fluid pressure measured by pressure sensor 96 to the fluid pressure in fluid source 36 and the predetermined condition may be that the fluid pressure measured by pressure sensor 96 is not less than or equal to the fluid pressure in fluid source 36. If controller 26 determines that the fluid pressure measured by pressure sensor 96 does not meet the predetermined condition relative to the measured fluid pressure in the corresponding fluid source 34 and fluid source 36, controller 26 will generate an alert which may again take any of the forms discussed hereinabove in connection with step 124.

The process outlined in steps 118 through 130 for solenoid valve 80 is preferably repeated in steps 132 through 144 for solenoid valve 82 if and when the fluid pressure in fluid source 36 is greater than the fluid pressure in fluid source 34. Therefore, controller 26 may be further configured in step 132 to determine whether the fluid pressure in fluid source 36 is greater than the fluid pressure in fluid source 34. This step may take place following step 130, following a determination in step 128 that the measured fluid pressure by pressure sensor 96 meets the predetermined condition relative to the fluid pressure in fluid source 34 or immediately following a determination in step 118 that the fluid pressure in fluid source 34 is not greater than the fluid pressure in fluid source 36. If the fluid pressure in fluid source 36 is greater than the fluid pressure in fluid source 34, the method may continue with the step 132 of moving solenoid valve 82 from its normally open state in which supply port 100 and delivery port 104 are in fluid communication to a closed state in which delivery port 104 and exhaust port 108 are in fluid communication. Controller 26 may transmit a signal to solenoid valve 82 to energize solenoid valve 82 and move valve 82 from the open state to the closed state. Doing so will block fluid flow from supply port 100 to delivery port 104 on solenoid valve 82 and vent the conduit 42 between parking brake valve module 78 and solenoid valve 82. Referring to FIG. 2, due to the absence of fluid pressure in this conduit and at port 88, double check valve 90 in parking brake valve module 78 will output the fluid pressure received at port 86 from fluid source 34 and solenoid valve 80 and pressure sensor 96 will generate a pressure signal indicative of this fluid pressure.

Referring again to FIG. 3, the method may continue with the steps 136, 138 of comparing the fluid pressure measured by pressure sensor 96 with the measured fluid pressure in the other of fluid source 34 and fluid source 36 (i.e., if the fluid pressure measured by pressure sensor 96 is compared to the fluid pressure in fluid source 36 in step 118, the fluid pressure measured by pressure 96 will be compared to the fluid pressure in fluid source 34 in step 136) and generating an alert when the fluid pressure measured by pressure sensor 96 does not meet a predetermined condition relative to the measured fluid pressure in the other of fluid source 34 and fluid source 36. If system 12 is operating properly, the fluid pressure measured by pressure sensor 96 should be equal or at least substantially equal to the fluid pressure in fluid source 34 and less than the fluid pressure in fluid source 36 following the closure of solenoid valve 82. If the fluid pressure measured by pressure sensor 96 does not approximate the measured fluid pressure in fluid source 34 or is greater than the fluid pressure in fluid source 36, a defect may again exist in any of solenoid valves 80, 82, the conduits 42 between the fluid sources 34, 36 and solenoid valves 80, 82 and between solenoid valves 80, 82 and parking brake valve module 78, secondary controller 26 or the wiring between secondary controller 26 and solenoid valves 80, 82. Therefore, in one embodiment illustrated in FIG. 3, secondary controller 26 may compare the fluid pressure measured by pressure sensor 96 to the fluid pressure in fluid source 34 and the predetermined condition may be that the fluid pressure measured by pressure sensor 96 is equal to the measured fluid pressure in fluid source 34. Alternatively, the predetermined condition may be that the fluid pressure measured by pressure sensor 96 does not differ from the measured fluid pressure in fluid source 34 by more than a predetermined amount (i.e., the difference is less than a predetermined offset from the measured fluid pressure in fluid source 34 or is within a predetermined range containing the measured fluid pressure in fluid source 34). In yet another embodiment, in which secondary controller 26 compares the fluid pressure measured by pressure sensor 96 to the fluid pressure in fluid source 34 in step 122, secondary controller 26 may compare the fluid pressure measured by pressure sensor 96 to the fluid pressure in fluid source 36 and the predetermined condition may be that the fluid pressure measured by pressure sensor 96 is not greater than or equal to the fluid pressure in fluid source 36. If controller 26 determines that the fluid pressure measured by pressure sensor 96 does not meet the predetermined condition relative to the measured fluid pressure in the other of fluid source 34 and fluid source 36, controller 26 will generate an alert which may again take any of the forms discussed hereinabove in connection with step 124.

After step 138, or if the comparison in step 136 indicates that the fluid pressure measured by pressure sensor 96 meets the predetermined condition relative to the measured fluid pressure in the other one of fluid source 34 and fluid source 36, the method may continue with the step 140 of returning the solenoid valve 82 to its normally open state from the closed state. Controller 26 may transmit a signal to solenoid valve 82 to deenergize solenoid valve 82 and move valve 82 from the closed state to the open state. Steps 134 through 140 are again performed in relatively quick succession to prevent and/or minimize the potential release of the parking brakes in wheel brakes 12. Returning valve 82 to its normally open state will again place supply port 100 and delivery port 104 of solenoid valve 82 in fluid communication. Referring to FIG. 2, because the fluid pressure in fluid source 36 is greater than the fluid pressure in fluid source 34, double check valve 90 in parking brake valve module 78 will output the fluid pressure received at port 88 from fluid source 36 and solenoid valve 82 and pressure sensor 96 will generate a pressure signal indicative of this fluid pressure.

Referring again to FIG. 3, the method may continue with the steps 142, 144 of comparing the fluid pressure measured by pressure sensor 96 with the measured fluid pressure in the one of fluid source 34 and fluid source 36 (i.e., if the fluid pressure measured by pressure sensor 96 is compared to the fluid pressure in fluid source 36 in step 118, the fluid pressure measured by pressure 96 will be compared to the fluid pressure in fluid source 36 in step 136) and generating an alert when the fluid pressure measured by pressure sensor 96 does not meet a predetermined condition relative to the measured fluid pressure in the one of fluid source 34 and fluid source 36. If system 12 is operating properly, the fluid pressure measured by pressure sensor 96 should increase from the pressure measured prior to step 140 and the opening of solenoid valve 82 and should now be equal or at least substantially equal to the fluid pressure in fluid source 36 and greater than the fluid pressure in fluid source 34. If the fluid pressure measured by pressure sensor 96 does not approximate the measured fluid pressure in fluid source 36 or is less than fluid pressure in fluid source 34, a defect may again exist in any of solenoid valves 80, 82, the conduits 42 between the fluid sources 34, 36 and solenoid valves 80, 82 and between solenoid valves 80, 82 and parking brake valve module 78, secondary controller 26 or the wiring between secondary controller 26 and solenoid valves 80, 82. Therefore, in one embodiment illustrated in FIG. 3, secondary controller 26 may compare the fluid pressure measured by pressure sensor 96 to the fluid pressure in fluid source 36 and the predetermined condition may be that the fluid pressure measured by pressure sensor 96 is equal to the measured fluid pressure in fluid source 36. Alternatively, the predetermined condition may be that the fluid pressure measured by pressure sensor 96 does not differ from the measured fluid pressure in fluid source 36 by more than a predetermined amount (i.e., the difference is less than a predetermined offset from the measured fluid pressure in fluid source 36 or is within a predetermined range containing the measured fluid pressure in fluid source 36). In yet another embodiment, in which secondary controller 26 compares the fluid pressure measured by pressure sensor 96 to the fluid pressure in fluid source 34 in step 122, secondary controller 26 may compare the fluid pressure measured by pressure sensor 96 to the fluid pressure in fluid source 34 and the predetermined condition may be that the fluid pressure measured by pressure sensor 96 is not less than or equal to the fluid pressure in fluid source 34. If controller 26 determines that the fluid pressure measured by pressure sensor 96 does not meet the predetermined condition relative to the measured fluid pressure in the one of fluid source 34 and fluid source 36, controller 26 will generate an alert which may again take any of the forms discussed hereinabove in connection with step 124.

Figure 4:
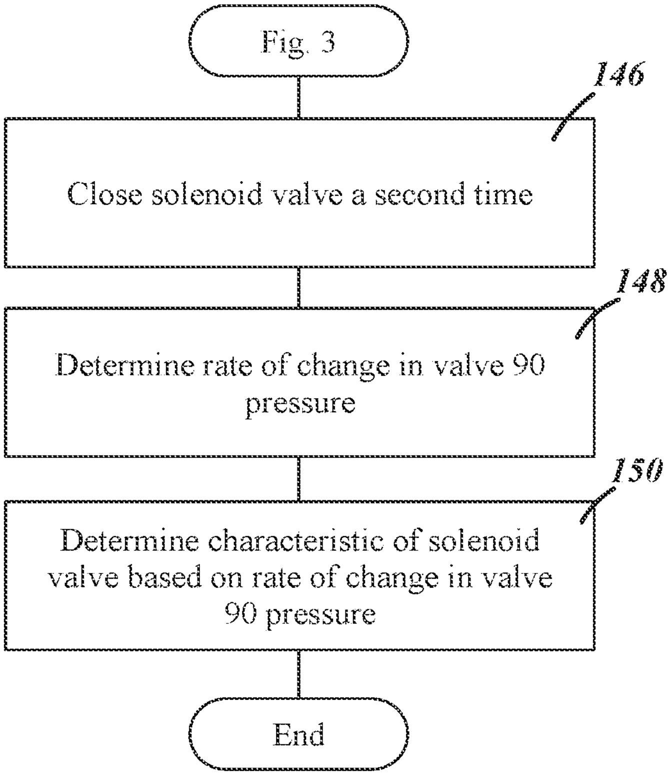
FIG. 4 is a flow chart diagram illustrating several steps in an alternative embodiment of a method in accordance with the teachings set forth herein.

Referring now to FIG. 4, in addition to verifying the general operation of secondary controller 26 and solenoid valves 80, 82 and that solenoid valves 80, 82 open and close, additional steps may be performed to determine other characteristics of valves 80, 82 including, for example, the rate at which valves 80, 82 open and close which may be indicative of a blocked exhaust port 106, 108 on solenoid valve 80, 82, respectively. In particular, after solenoid valve 80 or 82 has been returned to its open state (see, e.g., step 126 or 140 in FIG. 3), controller 26 may, in step 146, transmit a signal to solenoid valve 80 or 82 to energize solenoid valve 80 or 82 and again move valve 80 or 82 from the open state to the closed state. Doing so will again block fluid flow between corresponding supply 98 or 100 and delivery ports 102 or 104 in the closed valve 80 or 82 and vent the conduit 42 between parking brake valve module 78 and the closed valve 80 or 82 thereby causing double check valve 90 in parking brake valve module 78 to output the fluid pressure received from the fluid source 34 or 36 coupled to the other, open valve 80 or 82 and pressure sensor 96 to generate a pressure signal indicative of this fluid pressure. Using this measured pressure and the measured pressure previously obtained from pressure sensor 96 following step 120 or 134 in FIG. 3, controller 26 may, in step 148, determine a rate of change in the pressure measured by pressure sensor 96 between step 120 or 134 and step 146 and in step 150, determine a characteristic of the closed solenoid valve 80 or 82, such as the rate of closing of the valve 80 or 82, responsive to the rate of change. It should be understood that the rate of opening of solenoid valve 80 or 82 could be determined in a similar manner by again returning the valve 80 or 82 to its open state, determining a rate of change in the measured fluid pressure by pressure sensor 96 between step 126 or 140 and after returning the valve 80 or 82 to its open state, and determining the rate of opening or another characteristic of valve 80 or 82 responsive to the rate of change.

A brake control system 10 and method in accordance with the teachings disclosed herein is advantageous relative to conventional systems and methods. Because the system 10 and method facilitate testing of the secondary controller 26 and related components without relying on audible signals, the system 10 and method are more reliable and can be used on autonomous vehicles without adding additional components. Because the system 10 and method facilitate testing of the secondary controller 26 and related components without relying on the measurement of electrical values associated with the transmission and reception of electrical control signals, the system 10 and method can be implemented without substantial modifications to existing secondary controllers 26 having limited capabilities and functionality and despite the use of relatively simple solenoid valves 80, 82 in the fluid circuit 14.

While the invention has been shown and described with reference to one or more particular embodiments thereof, it will be understood by those of skill in the art that various changes and modifications can be made without departing from the spirit and scope of the invention.

What is claimed is:

1. A brake control system for a vehicle, comprising:

a fluid circuit configured to generate and distribute fluid pressure, the fluid circuit including a parking brake valve module configured to control delivery of fluid pressure to, and venting of fluid pressure from, a brake actuator of a wheel brake to apply and release a parking brake, the parking brake valve module configured to receive a first fluid pressure from a first fluid source and a second fluid pressure from a second fluid source and including a double check valve configured to deliver a greater fluid pressure of the first fluid pressure and the second fluid pressure; and, a pressure sensor that generates a greater pressure signal indicative of the greater fluid pressure;

a first solenoid valve having a supply port in communication with the first fluid source, a delivery port in fluid communication with the parking brake valve module, and an exhaust port, the first solenoid valve biased to a first state in which the supply port and delivery port are in fluid communication; and, a second solenoid valve having a supply port in communication with the second fluid source, a delivery port in fluid communication with the parking brake valve module, and an exhaust port, the second solenoid valve biased to a first state in which the supply port and delivery port are in fluid communication a primary controller configured to control a first set of components in the fluid circuit;

a secondary controller configured to control a second set of components in the fluid circuit following a failure of the primary controller, the secondary controller further configured, prior to the failure of the primary controller, to receive a first pressure signal indicative of the first fluid pressure, a second pressure signal indicative of the second fluid pressure and the greater pressure signal;

move, when the first fluid pressure is greater than the second fluid pressure, the first solenoid valve from the first state to a second state in which the delivery port and exhaust port are in fluid communication;

compare the greater fluid pressure to one of the first fluid pressure and the second fluid pressure; and, generate an alert when the greater fluid pressure does not meet a first predetermined condition relative to the one of the first fluid pressure and the second fluid pressure.

2. The system of claim 1 wherein the secondary controller is further configured, prior to the failure of the primary controller, to:

return the first solenoid valve to the first state;

compare the greater fluid pressure to another of the first fluid pressure and the second fluid pressure; and, generate an alert when the greater fluid pressure does not meet a second predetermined condition relative to the another of the first fluid pressure and the second fluid pressure.

3. The system of claim 2 wherein the secondary controller is further configured, prior to the failure of the primary controller, to:

move, when the second fluid pressure is greater than the first fluid pressure, the second solenoid valve from the first state to a second state in which the delivery port and exhaust port of the second solenoid valve are in fluid communication;

compare the greater fluid pressure to another of the first fluid pressure and the second fluid pressure; and, generate an alert when the greater fluid pressure does not meet a third predetermined condition relative to the another of the first fluid pressure and the second fluid pressure.

4. The system of claim 3 wherein the secondary controller is further configured, prior to the failure of the primary controller, to:

return the second solenoid valve to the first state;

compare the greater fluid pressure to the one of the first fluid pressure and the second fluid pressure; and, generate an alert when the greater fluid pressure does not meet a fourth predetermined condition relative to the one of the first fluid pressure and the second fluid pressure.

5. The system of claim 1 wherein the secondary controller is further configured to determine an operating state of the vehicle and wherein the second controller only moves the first solenoid valve if the operating state of the vehicle meets a second predetermined condition.

6. The system of claim 1 wherein the vehicle is an autonomous vehicle operating without input from an operator.

7. The system of claim 1 wherein the secondary controller is further configured to:

return the first solenoid valve to the first state;

move, a second time, the first solenoid valve from the first state to the second state;

determine a rate of change in the greater pressure before and after the second time; and, determine a characteristic of the second solenoid valve responsive to the rate of change in the greater pressure.

8. An article of manufacture, comprising:

a non-transitory computer storage medium having a computer program encoded thereon that, when executed by a secondary controller of a brake control system for a vehicle, performs a diagnostic test of a parking brake control function of the secondary controller, the brake control system including a fluid circuit configured to generate and distribute fluid pressure, the fluid circuit including a parking brake valve module configured to control delivery of fluid pressure to, and venting of fluid pressure from, a brake actuator of a wheel brake to apply and release a parking brake, the parking brake valve module configured to receive a first fluid pressure from a first fluid source and a second fluid pressure from a second fluid source and including a double check valve configured to deliver a greater fluid pressure of the first fluid pressure and the second fluid pressure and a pressure sensor that generates a greater pressure signal indicative of the greater fluid pressure, a first solenoid valve having a supply port in communication with the first fluid source, a delivery port in fluid communication with the parking brake valve module, and an exhaust port, the first solenoid valve biased to a first state in which the supply port and delivery port are in fluid communication, and a second solenoid valve having a supply port in communication with the second fluid source, a delivery port in fluid communication with the parking brake valve module, and an exhaust port, the second solenoid valve biased to a first state in which the supply port and delivery port are in fluid communication, the brake control system further including a primary controller configured to control a first set of components in the fluid circuit and the secondary controller, the secondary controller configured to control a second set of components in the fluid circuit following a failure of the primary controller, the computer program include code for:

receiving a first pressure signal indicative of the first fluid pressure, a second pressure signal indicative of the second fluid pressure and the greater pressure signal;

moving, when the first fluid pressure is greater than the second fluid pressure, the first solenoid valve from the first state to a second state in which the delivery port and exhaust port are in fluid communication;

comparing the greater fluid pressure to one of the first fluid pressure and the second fluid pressure; and, generating an alert when the greater fluid pressure does not meet a first predetermined condition relative to the one of the first fluid pressure and the second fluid pressure.

9. The article of manufacture of claim 8 wherein the computer program further includes code for:

returning the first solenoid valve to the first state;

comparing the greater fluid pressure to another of the first fluid pressure and the second fluid pressure; and, generating an alert when the greater fluid pressure does not meet a second predetermined condition relative to the another of the first fluid pressure and the second fluid pressure.

10. The article of manufacture of claim 9 wherein the computer program further includes code for:

moving, when the second fluid pressure is greater than the first fluid pressure, the second solenoid valve from the first state to a second state in which the delivery port and exhaust port of the second solenoid valve are in fluid communication;

comparing the greater fluid pressure to another of the first fluid pressure and the second fluid pressure; and, generating an alert when the greater fluid pressure does not meet a third predetermined condition relative to the another of the first fluid pressure and the second fluid pressure.

11. The article of manufacture of claim 10 wherein the computer program further includes code for:

returning the second solenoid valve to the first state;

comparing the greater fluid pressure to the one of the first fluid pressure and the second fluid pressure; and, generating an alert when the greater fluid pressure does not meet a fourth predetermined condition relative to the one of the first fluid pressure and the second fluid pressure.

12. The article of manufacture of claim 8 wherein the computer program further includes code for determining an operating state of the vehicle and wherein the second controller only executes the code for moving the first solenoid valve if the operating state of the vehicle meets a second predetermined condition.

13. The article of manufacture of claim 8 wherein the vehicle is an autonomous vehicle operating without input from an operator.

14. The article of manufacture of claim 9 wherein the computer program further includes code for:

returning the first solenoid valve to the first state;

moving, a second time, the first solenoid valve from the first state to the second state;

determining a rate of change in the greater pressure before and after the second time; and, determining a characteristic of the second solenoid valve responsive to the rate of change in the greater pressure.

15. A method for testing a parking brake control function of a secondary controller in a brake control system, the brake control system including a fluid circuit configured to generate and distribute fluid pressure, the fluid circuit including a parking brake valve module configured to control delivery of fluid pressure to, and venting of fluid pressure from, a brake actuator of a wheel brake to apply and release a parking brake, the parking brake valve module configured to receive a first fluid pressure from a first fluid source and a second fluid pressure from a second fluid source and including a double check valve configured to deliver a greater fluid pressure of the first fluid pressure and the second fluid pressure and a pressure sensor that generates a greater pressure signal indicative of the greater fluid pressure, a first solenoid valve having a supply port in communication with the first fluid source, a delivery port in fluid communication with the parking brake valve module, and an exhaust port, the first solenoid valve biased to a first state in which the supply port and delivery port are in fluid communication, and a second solenoid valve having a supply port in communication with the second fluid source, a delivery port in fluid communication with the parking brake valve module, and an exhaust port, the second solenoid valve biased to a first state in which the supply port and delivery port are in fluid communication, the brake control system further including a primary controller configured to control a first set of components in the fluid circuit and the secondary controller, the secondary controller configured to control a second set of components in the fluid circuit following a failure of the primary controller, the method comprising:

receiving a first pressure signal indicative of the first fluid pressure, a second pressure signal indicative of the second fluid pressure and the greater pressure signal;

moving, when the first fluid pressure is greater than the second fluid pressure, the first solenoid valve from the first state to a second state in which the delivery port and exhaust port are in fluid communication;

comparing the greater fluid pressure to one of the first fluid pressure and the second fluid pressure; and, generating an alert when the greater fluid pressure does not meet a first predetermined condition relative to the one of the first fluid pressure and the second fluid pressure.

16. The method of claim 15, further comprising:

returning the first solenoid valve to the first state;

comparing the greater fluid pressure to another of the first fluid pressure and the second fluid pressure; and, generating an alert when the greater fluid pressure does not meet a second predetermined condition relative to the another of the first fluid pressure and the second fluid pressure.

17. The method of claim 16, further comprising:

moving, when the second fluid pressure is greater than the first fluid pressure, the second solenoid valve from the first state to a second state in which the delivery port and exhaust port of the second solenoid valve are in fluid communication;

comparing the greater fluid pressure to another of the first fluid pressure and the second fluid pressure; and, generating an alert when the greater fluid pressure does not meet a third predetermined condition relative to the another of the first fluid pressure and the second fluid pressure.

18. The method of claim 17, further comprising:

returning the second solenoid valve to the first state;

comparing the greater fluid pressure to the one of the first fluid pressure and the second fluid pressure; and, generating an alert when the greater fluid pressure does not meet a fourth predetermined condition relative to the one of the first fluid pressure and the second fluid pressure.

19. The method of claim 15, further comprising determining an operating state of the vehicle and only moving the first solenoid valve if the operating state of the vehicle meets a second predetermined condition.

20. The method of claim 15, further comprising:

returning the first solenoid valve to the first state;

moving, a second time, the first solenoid valve from the first state to the second state;

determining a rate of change in the greater pressure before and after the second time; and, determining a characteristic of the second solenoid valve responsive to the rate of change in the greater pressure.

* * * * *